(12) United States Patent
Cho et al.

(10) Patent No.: US 8,142,065 B2
(45) Date of Patent: Mar. 27, 2012

(54) BACKLIGHT ASSEMBLY AND DISPLAY DEVICE HAVING THE SAME

(75) Inventors: Joo-Woan Cho, Asan-si (KR);
Du-Hwan Chung, Suwon-si (KR);
Byung-Choon Yang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 528 days.

(21) Appl. No.: 12/352,975

(22) Filed: Jan. 13, 2009

(65) Prior Publication Data
US 2009/0244886 A1    Oct. 1, 2009

(30) Foreign Application Priority Data
Mar. 28, 2008    (KR) .................. 10-2008-0029208

(51) Int. Cl.
*H01R 33/00*    (2006.01)
(52) U.S. Cl. .................. 362/646; 362/97.3; 362/631
(58) Field of Classification Search .............. 362/97.1, 362/97.2, 97.3, 97.4, 219, 221, 225, 240, 362/249.02, 631, 646, 652, 657, 658, 659; 439/60, 61, 62, 65
See application file for complete search history.

(56) References Cited

U.S. PATENT DOCUMENTS

| 5,017,146 A * | 5/1991 | Uehara et al. ................ 439/65 |
| 7,673,999 B2 * | 3/2010 | Back et al. .................. 362/221 |
| 2005/0265051 A1 * | 12/2005 | Yamamoto et al. ......... 362/657 |
| 2007/0053176 A1 * | 3/2007 | Chou ........................ 362/97.1 |
| 2009/0174838 A1 * | 7/2009 | Park et al. .................. 362/240 |

FOREIGN PATENT DOCUMENTS

| JP | 2005-099463 | 4/2005 |
| KR | 1020070040253 | 4/2007 |
| KR | 1020070059592 | 6/2007 |

* cited by examiner

*Primary Examiner* — Y My Quach Lee
(74) *Attorney, Agent, or Firm* — F. Chau & Associates, LLC (57) ABSTRACT

A backlight assembly includes at least one light-generating board, a light source driving board and a coupling board. The light-generating board generates light. The light source driving board provides control signals to the light-generating board. The coupling board is coupled via slot connectors to the light-generating board and the light source driving board to electrically connect the light-generating board and the light source driving board to each other. Thus, manufacturing efficiency may be improved in comparison with electrically connecting the light-generating board and the light source driving board through wires.

21 Claims, 13 Drawing Sheets

BACKLIGHT ASSEMBLY AND DISPLAY DEVICE HAVING THE SAME

CROSS-REFERENCE TO RELATED APPLICATION

This application claims priority under 35 U.S.C. §119 to Korean Patent Application No. 2008-29208, filed on Mar. 28, 2008 in the Korean Intellectual Property Office (KIPO), the contents of which are herein incorporated by reference in their entirety.

BACKGROUND OF THE INVENTION

1. Technical Field

Example embodiments of the present invention relate to a backlight assembly and a display device having the backlight assembly. More particularly, example embodiments of the present invention relate to a backlight assembly including light-emitting diodes (LEDs) serving as a light source, and a display device having the backlight assembly.

2. Discussion of the Related Art

A liquid crystal display (LCD) device typically includes an LCD panel displaying an image by using the optical transmissivity of liquid crystal molecules and a backlight assembly disposed behind the LCD panel to provide light to the LCD panel.

A backlight assembly that has been recently developed includes a light-generating board including light-emitting diodes (LEDs) enhancing, for example, color reproducibility, and contrast ratio, a receiving container receiving the light-generating board, and a light source driving board controlling the light-generating board. The light-generating board and the light source driving board may be electrically connected to each other through wires.

Since the light-generating board includes many LEDs, many wires are also required. Thus, when many wires are included in the backlight assembly, it may be difficult for workers to electrically connect the light-generating board and the light source driving board to each other through the wires, and the wires may be disconnected during a manufacturing process or while transporting the backlight assembly. As a result, establishing electrical connections between the light-generating board and the light source driving board through the wires may reduce manufacturing efficiency and generate disconnection defects of the wires.

SUMMARY OF THE INVENTION

Example embodiments of the present invention provide a backlight assembly capable of improving manufacturing efficiency in electrically connecting a light-generating board to a light source driving board.

Example embodiments of the present invention also provide a display device having the above-mentioned backlight assembly.

According to an embodiments of the present invention, a backlight assembly includes at least one light-generating board, a light source driving board and a coupling board.

The light-generating board generates light. The light source driving board controls the light-generating board. The coupling board is coupled via slot connectors to the light-generating board and the light source driving board to electrically connect the light-generating board and the light source driving board to each other.

The backlight assembly may further include a receiving container including a bottom plate and a sidewall extending from the bottom plate and receiving the light-generating board and the coupling board.

In an example embodiment, the coupling board may further include a coupling board body and at least one coupling slot connector. The coupling board body may be received in the receiving container and disposed at a side of the light-generating board substantially perpendicular to the bottom plate. The coupling slot connector may be disposed on a face of the coupling board body facing the light-generating board. A portion of the light-generating board may be inserted into the coupling slot connector to be electrically connected to the coupling slot connector, and electrically connect the light-generating board to the coupling board.

In an example embodiment, the light-generating board may further include a light-generating board body, a plurality of light sources and a protrusion. The light-generating board body may be disposed substantially parallel with the bottom plate. The light sources may be disposed on a face of the light-generating board body not facing the bottom plate. The protrusion may protrude from the light-generating board body toward the coupling board to be inserted into the coupling slot connector.

In an example embodiment, the light source driving board may further include a driving board body and a driving slot connector. The driving board body may be disposed under the bottom plate and substantially parallel with the bottom plate. A portion of the coupling board is inserted into the driving slot connector via a connecting hole formed through the bottom plate to be electrically connected to the driving slot connector, and to electrically connect the coupling board with the driving board.

The bottom plate may have a substantially rectangular shape having short and long sides, in which a length in a first direction is longer than a length in a second direction substantially perpendicular to the first direction. The sidewall may include long sidewalls disposed at both long sides of the bottom plate and short sidewalls disposed at both short sides of the bottom plate.

The coupling board may be adjacent to and substantially parallel with one of the long sidewalls. The light-generating board may have a substantially rectangular shape, in which a length in the second direction is longer than a length in the first direction, and a plurality of the light-generating boards may be disposed along the first direction.

The light source driving board may be disposed under the bottom plate and adjacent to one of the long sides of the bottom plate. The light source driving board may have a substantially rectangular shape, in which a length in the first direction is longer than a length in the second direction.

The light source driving board may be disposed under the bottom plate and adjacent to one of the short sides of the bottom plate. The light source driving board may have a substantially rectangular shape, in which a length in the second direction is longer than a length in the first direction.

The coupling board may be adjacent to and substantially parallel with one of the short sidewalls. The light-generating board may have a substantially rectangular shape, in which a length in the first direction is longer than a length in the second direction, and a plurality of the light-generating boards may be disposed along the second direction. The backlight assembly may further include a board connecting part electrically connecting the light-generating boards adjacent to each other in the first direction.

A pair of coupling boards may be adjacent to and substantially parallel with respective short sidewalls, and a pair of light source driving boards may be disposed under the bottom plate and adjacent to respective short sides of the bottom plate.

According to another embodiment of the present invention, a display device includes a display panel displaying an image by using light and a backlight assembly providing the light to the display panel.

The backlight assembly includes at least one light-generating board, a light source driving board and a coupling board. The light-generating board generates light to provide the light to the display panel. The light source driving board controls the light-generating board. The coupling board is coupled via slots to the light-generating board and the light source driving board to electrically connect the light-generating board and the light source driving board to each other.

According to an embodiment of the present invention, a backlight assembly comprises a light-generating board including a first protrusion, a coupling board including a first slot and a second protrusion oriented substantially perpendicular to the first protrusion, a light source driving board including a second slot oriented substantially perpendicular to the first slot, wherein the first protrusion is inserted into the first slot and the second protrusion is inserted into the second slot to electrically connect the light-generating board with the light source driving board.

According to the embodiments of the present invention, a light-generating board is directly slot-coupled to a coupling board, and the coupling board is directly slot-coupled to a light source driving board. Thus, manufacturing efficiency and connection stability in electrically connecting the light-generating board and the light source driving board may be improved.

BRIEF DESCRIPTION OF THE DRAWINGS

The above and other features of the embodiments of the present invention will become more apparent by describing in detailed example embodiments thereof with reference to the accompanying drawings.

DETAILED DESCRIPTION OF THE INVENTION

The present invention is described more fully hereinafter with reference to the accompanying drawings, in which example embodiments of the present invention are shown. The present invention may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. Like numerals may refer to like elements throughout. As used herein, the term "and/or" includes any and all combinations of one or more of the associated listed items.

Hereinafter, the embodiments of the present invention will be explained in more detail with reference to the accompanying drawings.

Figure 1:
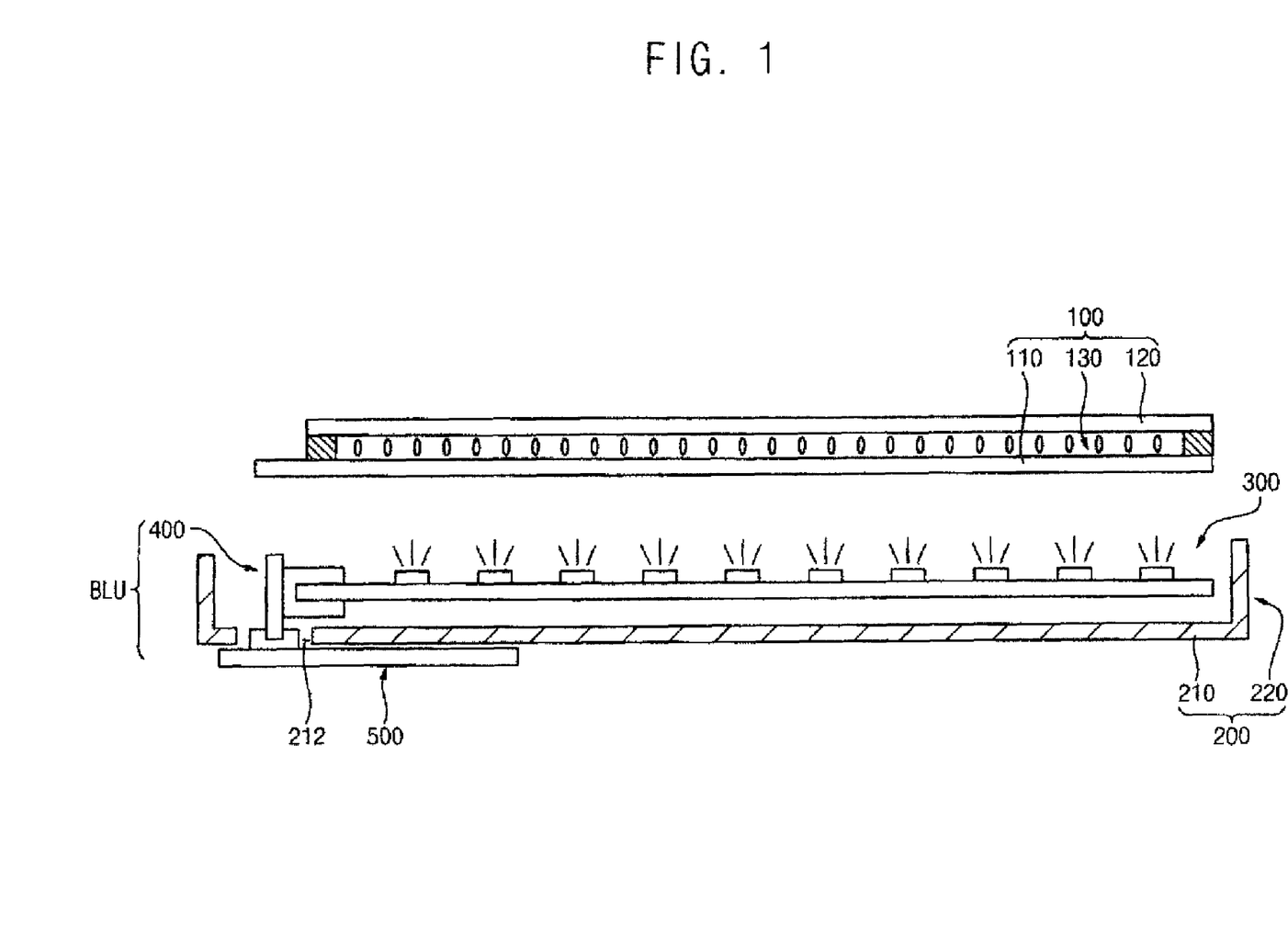
FIG. 1 is a cross-sectional view illustrating a display device according to an example embodiment of the present invention.

FIG. 1 is a cross-sectional view illustrating a display device according to an example embodiment of the present invention.

Referring to FIG. 1, a display device according to an example embodiment of the present invention includes a display panel 100 displaying an image by using light and a backlight assembly BLU disposed behind the display panel 100 to provide the light to the display panel 100.

The display panel 100 includes a first substrate 110, a second substrate 120 facing the first substrate 110, and a liquid crystal layer 130 interposed between the first and second substrates 110 and 120.

The first substrate 110 includes gate and data lines crossing each other, thin-film transistors (TFTs) electrically connected to the gate and data lines, and pixel electrodes electrically connected to the TFTs.

The second substrate 120 includes color filters corresponding to the pixel electrodes and a common electrode formed on a base substrate of the second substrate 120. The common electrode may be formed on the entire base substrate of the second substrate 120. The color filters may include, for example, red color filters, green color filters and blue color filters. Alternatively, the color filters may be included in the first substrate 110, and not the second substrate 120.

The liquid crystal layer 130 is interposed between the first and second substrates 110 and 120, and liquid crystal molecules of the liquid crystal layer 130 are rearranged by an electric field generated between the pixel electrodes and the common electrode. When the liquid crystal molecules are rearranged, the optical transmissivity of light passing through the liquid crystal molecules is changed, thereby displaying an image.

The backlight assembly BLU includes a receiving container 200, at least one light-generating board 300, a coupling board 400 and a light source driving board 500.

The receiving container 200 includes a bottom plate 210 having, for example, a plate shape and a sidewall 220 extending from the bottom plate. The receiving container 200 receives the light-generating board 300 and the coupling board 400 in a receiving space defined by the bottom plate 210 and the sidewall 220. The light source driving board 500 is disposed under the bottom plate 210.

The light-generating board 300 is received in the receiving container 200 to provide the light to the display panel 100. The light-generating board 300 may be substantially parallel with the bottom plate 210.

The coupling board 400 is received in the receiving container 200 and coupled to the light-generating board 300 using a slot and protrusion combination. The coupling board 400 may be disposed in a direction substantially perpendicular to the light-generating board 300.

The light source driving board 500 is disposed under the bottom plate 210, that is, disposed on a rear surface of the bottom plate 210. The light source driving board 500 is coupled to the coupling board 400 using a slot and protrusion combination. In order that the coupling board 400 is coupled to the light source driving board 500, a connecting hole 212 is formed through the bottom plate 210 corresponding to the location of the coupling board 400 and the slot and protrusion combination of the slot coupling and light source driving boards 400, 500.

The display device may further include an optical member (not shown) disposed between the light-generating board 300 and the display panel 100. For example, the optical member may include a light-diffusion plate, a prism sheet, a light-diffusion sheet, a luminance-enhancement sheet, etc.

Figure 2:
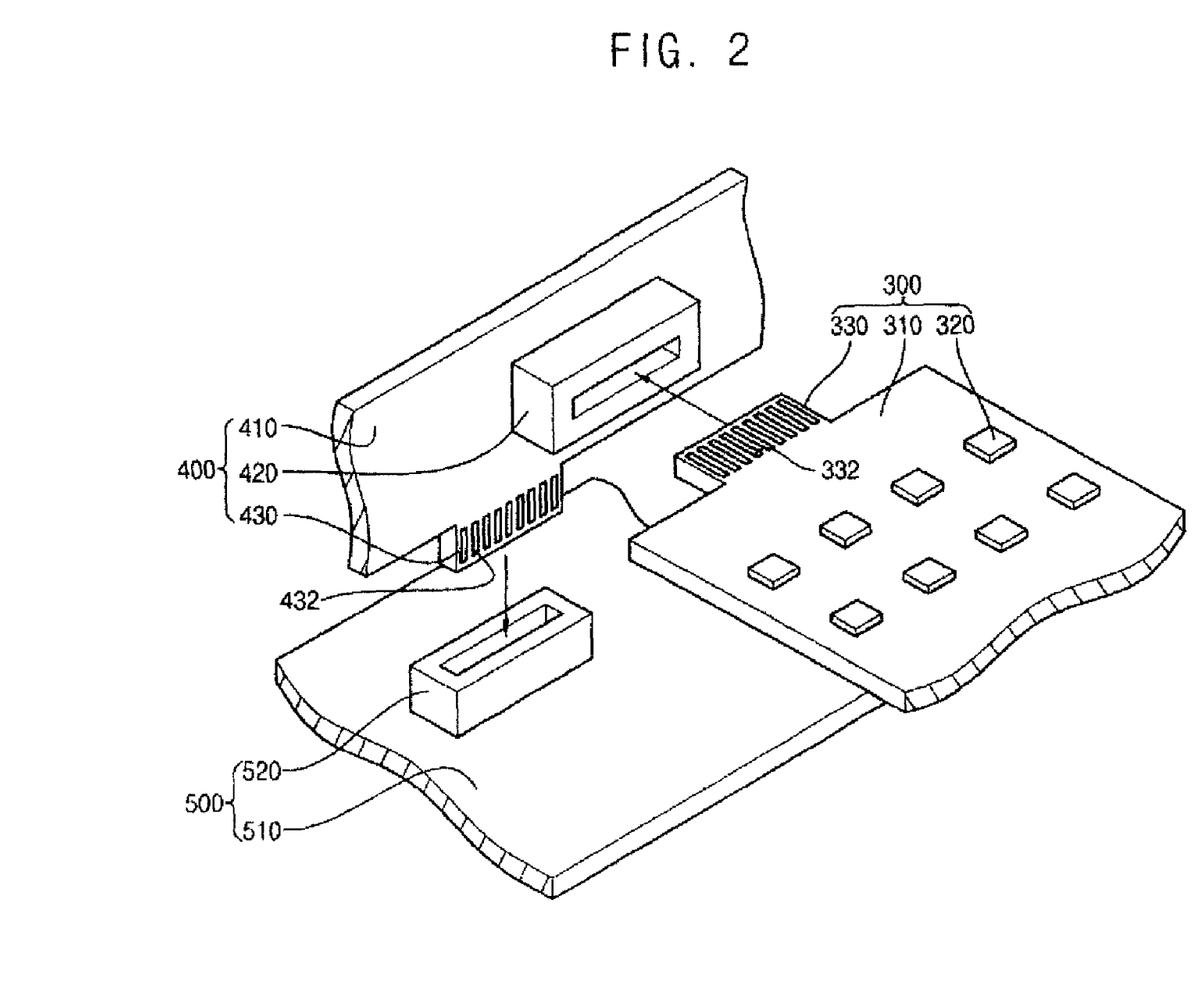
FIG. 2 is a perspective view illustrating electrical connections among a light-generating board, a coupling board and a light source driving board of the backlight assembly illustrated in FIG. 1.

FIG. 2 is a perspective view illustrating electrical connections among a light-generating board, a coupling board and a light source driving board of the backlight assembly illustrated in FIG. 1.

Referring to FIGS. 1 and 2, the light-generating board 300 may include a light-generating board body 310, a plurality of light sources 320 and an insertion protrusion 330.

The light-generating board body 310 may have a plate shape, and may be disposed substantially parallel with the bottom plate 210 of the receiving container 200. The light-generating board body 310 may have a substantially rectangular shape when viewed from a plan view.

The light sources 320 are disposed on a face of the light-generating board body 310 not facing the bottom plate 210, that is, on an upper face of the light-generating board body 310. For example, the light sources 320 may be arranged on the face of the light-generating board body 310 in a matrix shape, and electrically connected to wirings (not shown) of the light-generating board body 310.

The light sources 320 may include, for example, light-emitting diodes (LEDs) generating point-type light. The LEDs may include red LEDs, green LEDs and blue LEDs, and/or white LEDs.

The insertion protrusion 330 protrudes from the light-generating board body 310 toward the coupling board 400. A plurality of insertion patterns 332 electrically connected to the wirings of the light-generating board body 310 is formed on one face or two faces (e.g., top and bottom faces) of the insertion protrusion 330.

The coupling board 400 may include a coupling board body 410, at least one coupling slot connector 420 and a connection protrusion 430.

The coupling board body 410 has, for example, a plate shape, and is disposed in the receiving container 200. The coupling board body 410 may be disposed in a direction substantially perpendicular to the light-generating board body 310 and/or the bottom plate 210.

For example, the coupling board body 410 may have a substantially rectangular shape when viewed from a plan view. The length of the coupling board body 410 corresponds to the length of the sidewall 220 of the receiving container 200, and the width of the coupling board body 410 corresponds to the height of the sidewall 220. The length of the coupling board body 410 is smaller than the length of the sidewall 220, and the width of the coupling board body 410 is smaller than the height of the sidewall 220.

The coupling slot connector 420 is disposed on a face of the coupling board body 410 facing the light-generating board 300, and electrically connected to wirings of the coupling board body 410. The coupling slot connector 420 may be disposed corresponding to the insertion protrusion 330, and thus the insertion protrusion 330 may be inserted into and coupled to the coupling slot connector 420. The coupling slot connector 420 includes electrical contacts to connect with the connection patterns 332.

The connection protrusion 430 protrudes from the coupling board body 410 toward the light source driving board 500. A plurality of connection patterns 432 electrically connected to the wirings of the coupling board body 410 is formed on one face or two faces (e.g., top and bottom faces) of the connection protrusion 430.

The light source driving board 500 may include a driving board body 510 and a driving slot connector 520.

The driving board body 510 has, for example, a plate shape, and is disposed under the bottom plate 210. The driving board body 510 may be disposed in a direction substantially parallel with the bottom plate 210.

The driving slot connector 520 is disposed on a face of the driving board body 510 facing the bottom plate 210, and electrically connected to wirings of the driving board body 510. The driving slot connector 520 is disposed corresponding to the connection protrusion 430, and thus the connection protrusion 430 may be inserted into and coupled to the driving slot connector 520 via the connecting hole 212 of the bottom plate 210. The driving slot connector 520 may be inserted into the connecting hole 212. The driving slot connector 520 includes electrical contacts to connect with the connection patterns 432.

The light source driving board 500 may further include a light source driving element (not shown) to control the light sources 320. The light source driving element may be disposed on a first face or a second face opposite to the first face of the driving board body 510.

Thus, since the light source driving board 500 is electrically connected to the light-generating board 300 through the coupling board 400, the light source driving board 500 may control the light sources 320 to generate light.

Figure 3:
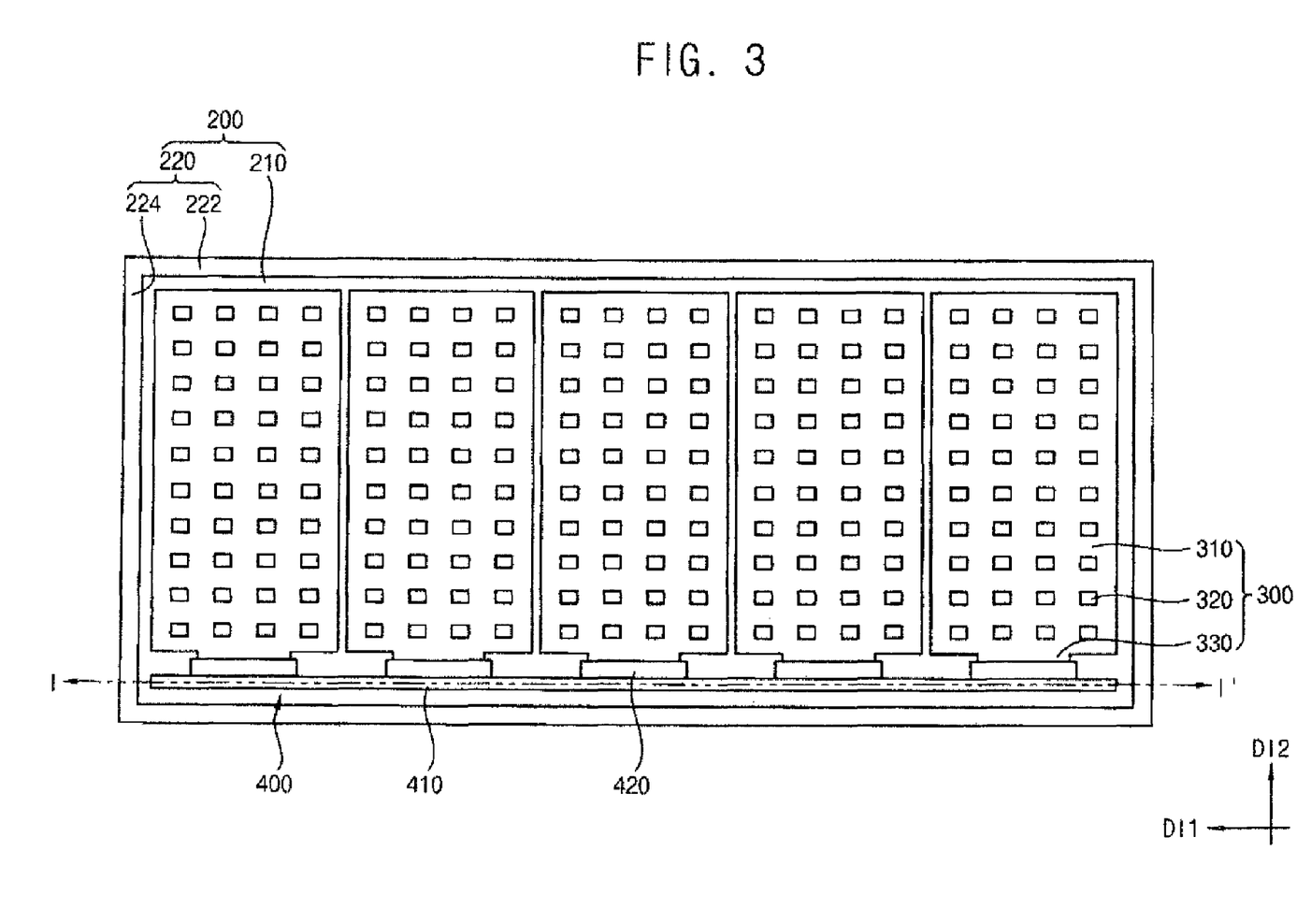
FIG. 3 is a plan view illustrating a positional relationship between a light-generating board and a coupling board of a backlight assembly according to an example embodiment of the present invention.
Figure 4:
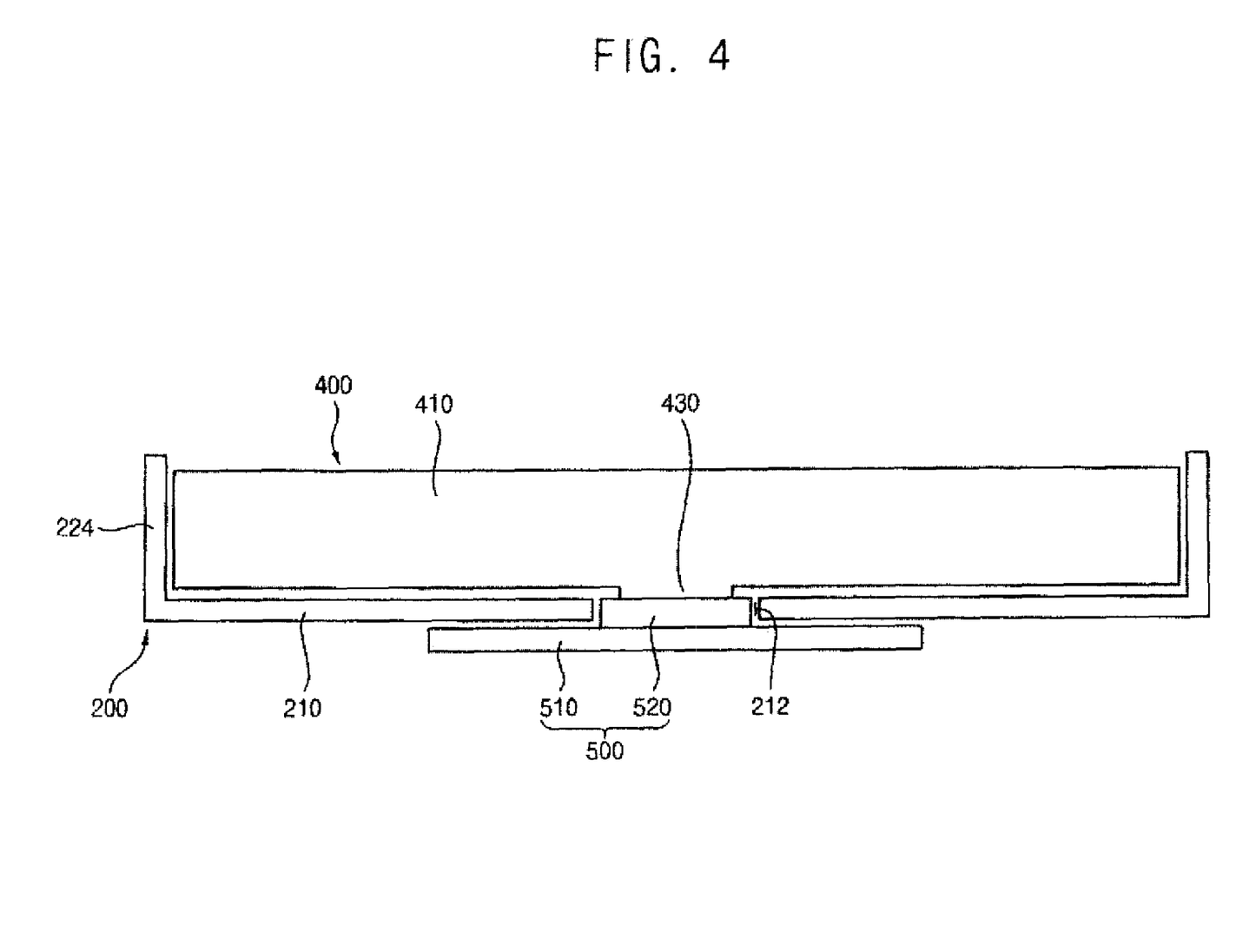
FIG. 4 is a cross-sectional view taken along a line I-I' in FIG. 3.
Figure 5:
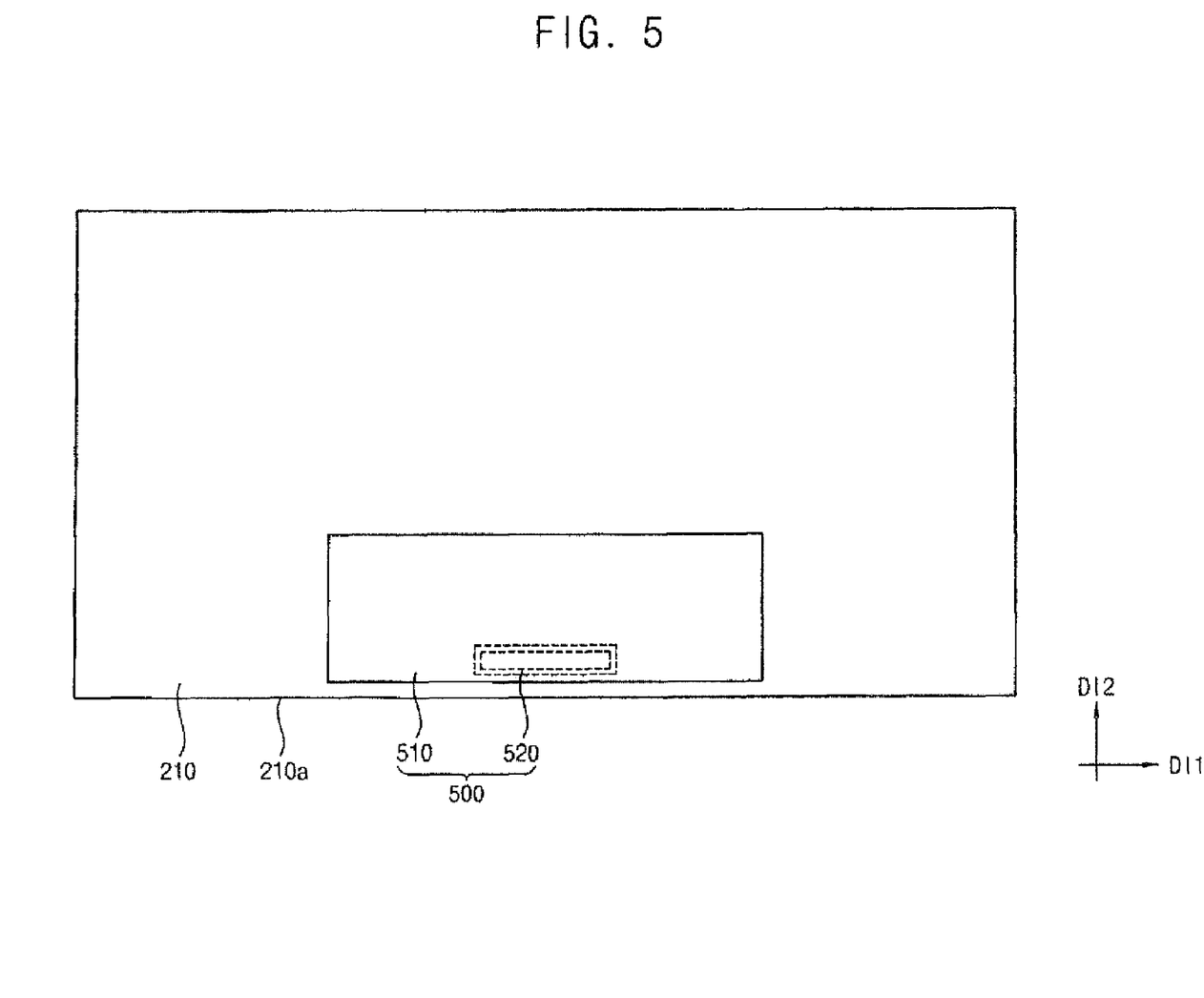
FIG. 5 is a plan view illustrating the position of a light source driving board in FIG. 3.

FIG. 3 is a plan view illustrating a positional relationship between a light-generating board and a coupling board of a backlight assembly according to an example embodiment of the present invention. FIG. 4 is a cross-sectional view taken along a line I-I' in FIG. 3. FIG. 5 is a plan view illustrating the position of a light source driving board in FIG. 3.

Referring to FIGS. 3, 4 and 5, the bottom plate 210 of the receiving container 200 may have a substantially rectangular shape, in which a length in a first direction DI1 is longer than a length in a second direction DI2 substantially perpendicular to the first direction DI1. In other words, the bottom plate 210 may have a substantially rectangular shape including long sides 210a in the first direction DI1 and short sides 210b in the second direction.

The sidewall 220 of the receiving container 200 may include long sidewalls 222 corresponding to the long sides 210a of the bottom plate 210 and short sidewalls 224 corresponding to the short sides 210b of the bottom plate 210.

The coupling board 400 is adjacent to and substantially parallel with one of the long sidewalls 222. Particularly, the coupling board body 410 is adjacent to and substantially parallel with the one of the long sidewalls 222, and the coupling slot connector 420 is disposed on a face of the coupling board body 410 not facing the one of the long sidewalls 222.

For example, five coupling slot connectors 420 may be disposed on the face of the coupling board body 410 and spaced at regular intervals. Thus, five light-generating boards 300 are disposed in a row along the first direction DI1 corresponding to the five coupling slot connectors 420. In other words, the insertion protrusions 330 of the five light-generating boards 300 are inserted into and coupled to the five coupling slot connectors 420, resepectively.

Each of the light-generating board bodies 310 of the five light-generating boards 300 may have a substantially rectangular shape, in which a length in the second direction DI2 is longer than a length in the first direction DI1. The light sources 320 may be disposed, for example, on a face of each light-generating board body 310 in ten rows and four columns.

Referring again to FIGS. 4 and 5, the light source driving board 500 may be disposed under the bottom plate 210, and adjacent to one of the long sides 210a corresponding to one of the long sidewalls 222. The light source driving board 500 may be disposed corresponding to the center of the one of the long sides 210a.

The driving board body 510 of the light source driving board 500 may have a substantially rectangular shape, in which a length in the first direction DI1 is longer than a length in the second direction DI2.

The driving slot connector 520 is disposed on a face of the driving board body 510 facing the coupling board 400. For example, the driving slot connector 520 may correspond to the center of the driving board body 510 in the first direction DI1, and be disposed adjacent to one of the long sides 210a. The driving slot connector 520 may be inserted into the connecting hole 212 of the bottom plate 210.

The connection protrusion 430 of the coupling board 400 protrudes from the coupling board body 410 toward the light source driving board 500, and is inserted into the driving slot connector 520. For example, the connection protrusion 430 may be disposed corresponding to the center of the coupling board body 410 in the first direction DI1. Thus, the coupling board 400 may have a substantially T-shaped cross-section.

In FIGS. 4 and 5, one connection protrusion 430 and one driving slot connector 520 are included in the coupling board 400 and the light source driving board 500, respectively. Alternatively, a plurality of connection protrusions 430 and a plurality of driving slot connectors 520 corresponding to the number of the connection protrusions 430 may be included in the coupling board 400 and the light source driving board 500, respectively.

Figure 6:
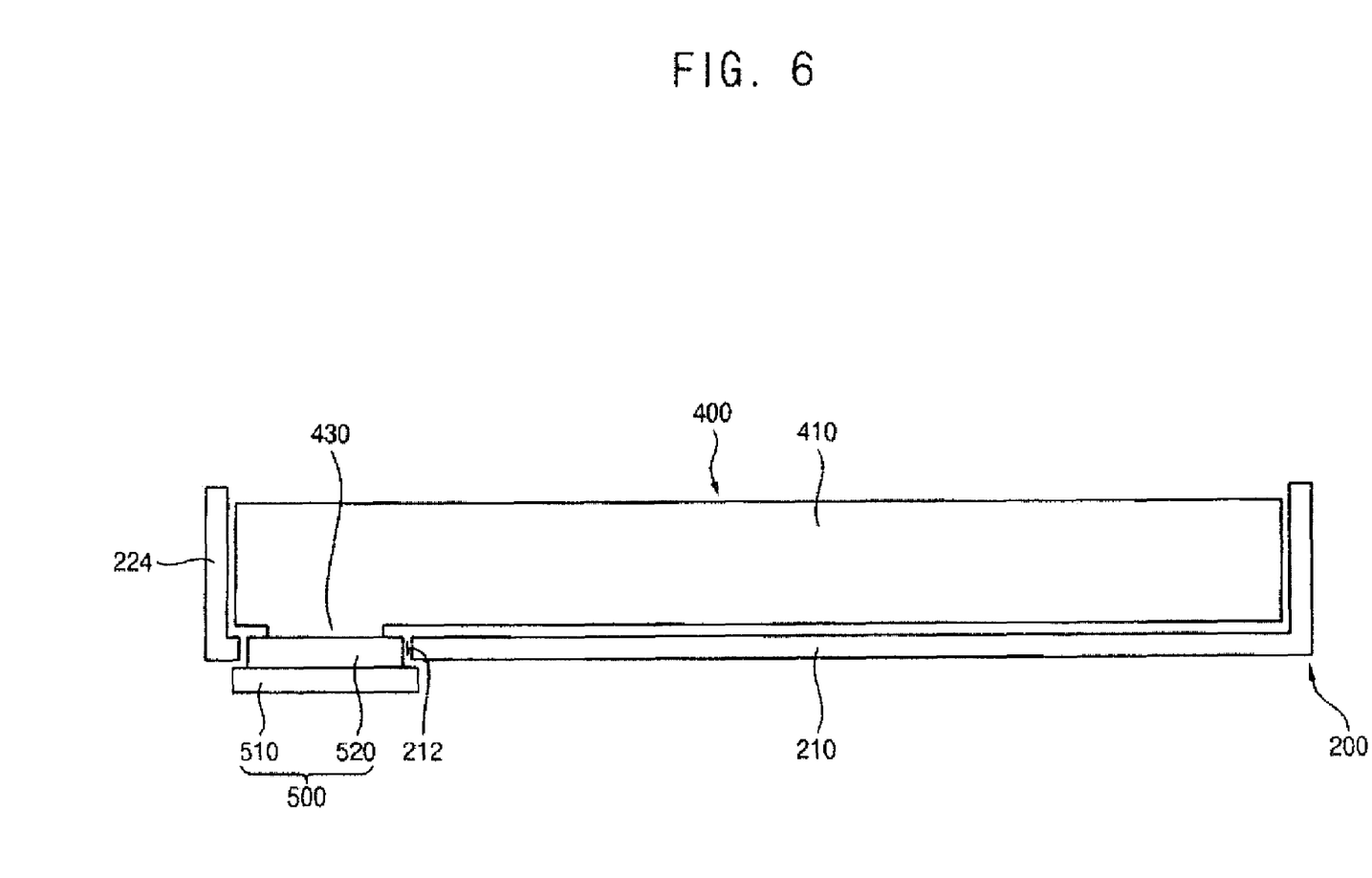
FIG. 6 is a cross-sectional view illustrating a coupling board according to an example embodiment of the present invention.
Figure 7:
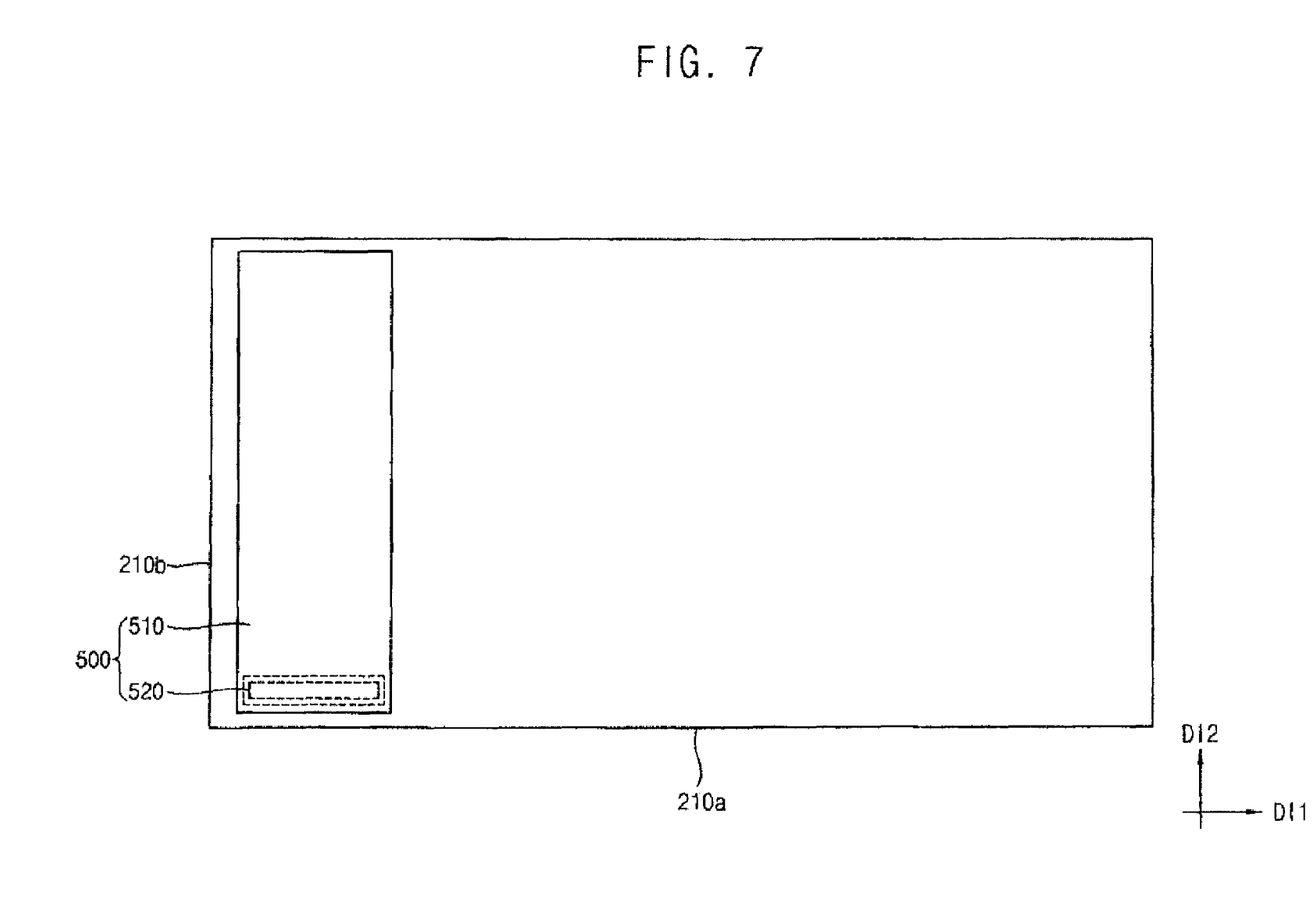
FIG. 7 is a plan view illustrating the position of a light source driving board in FIG. 6.

FIG. 6 is a cross-sectional view illustrating a coupling board having a shape according to an embodiment of the present invention. FIG. 7 is a plan view illustrating the position of a light source driving board in FIG. 6.

Referring to FIGS. 3, 6 and 7, the connection protrusion 430 may be disposed corresponding to an end portion in the first direction DI1 of the coupling board body 410. In other words, the connection protrusion 430 may be disposed adjacent to one of the short sidewalls 224 of the receiving container 200. As a result, the coupling board 400 may have a substantially L-shaped cross-section.

The light source driving board 500 may be disposed under the bottom plate 210, and adjacent to one of the short sides 210b of the bottom plate 210. In addition, the driving board body 510 of the light source driving board 500 may have a substantially rectangular shape, in which a length in the second direction DI2 is longer than a length in the first direction DI1.

The driving slot connector 520 of the light source driving board 500 is disposed at a position at which the driving board body 510 and the coupling board body 410 overlap each other. In other words, the driving slot connector 520 is disposed on an end portion in the second direction DI2 of the coupling board body 410, and substantially parallel with the first direction DI1.

Figure 8:
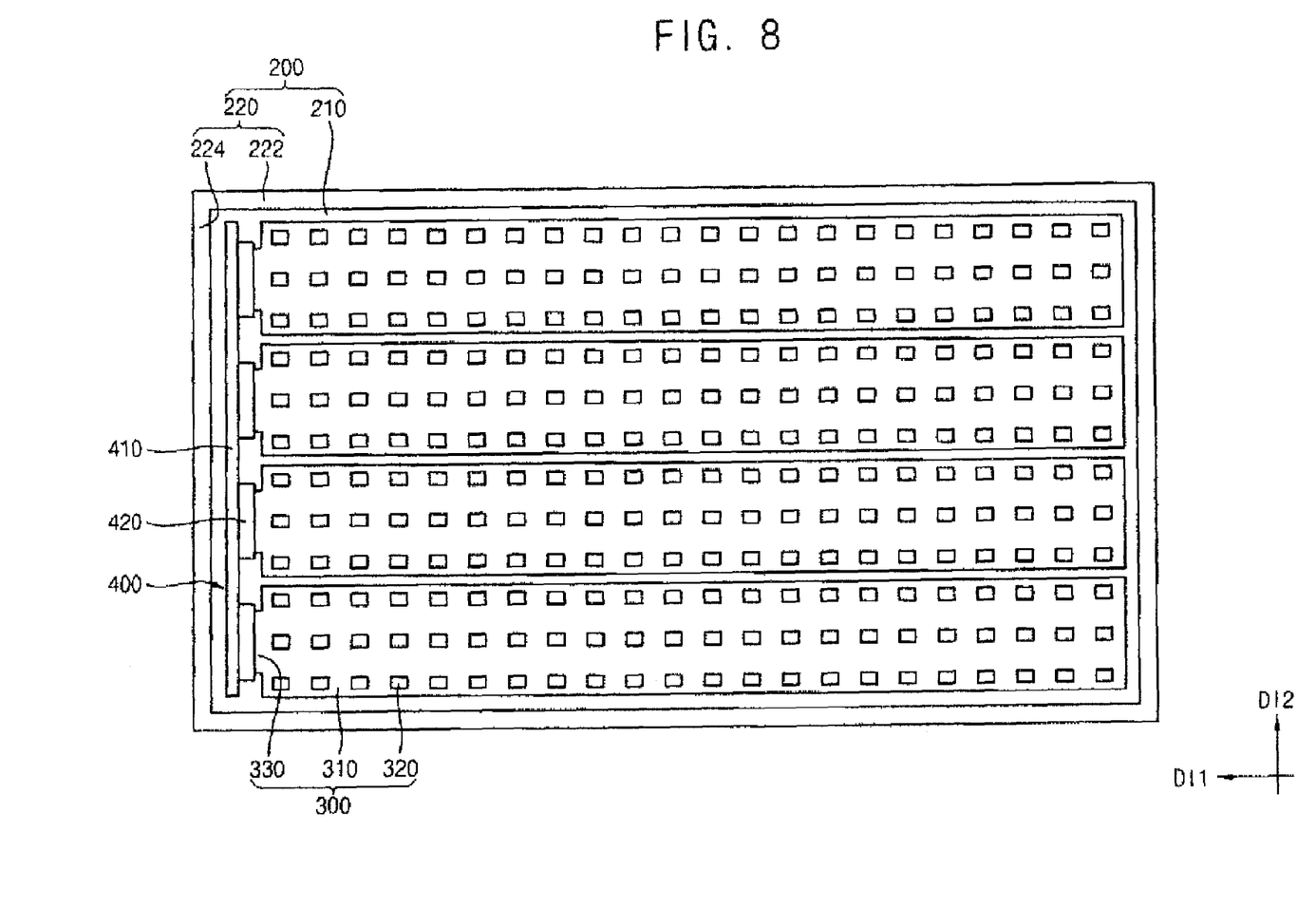
FIG. 8 is a plan view illustrating a positional relationship between a light-generating board and a coupling board of a backlight assembly according to an example embodiment of the present invention.
Figure 9:
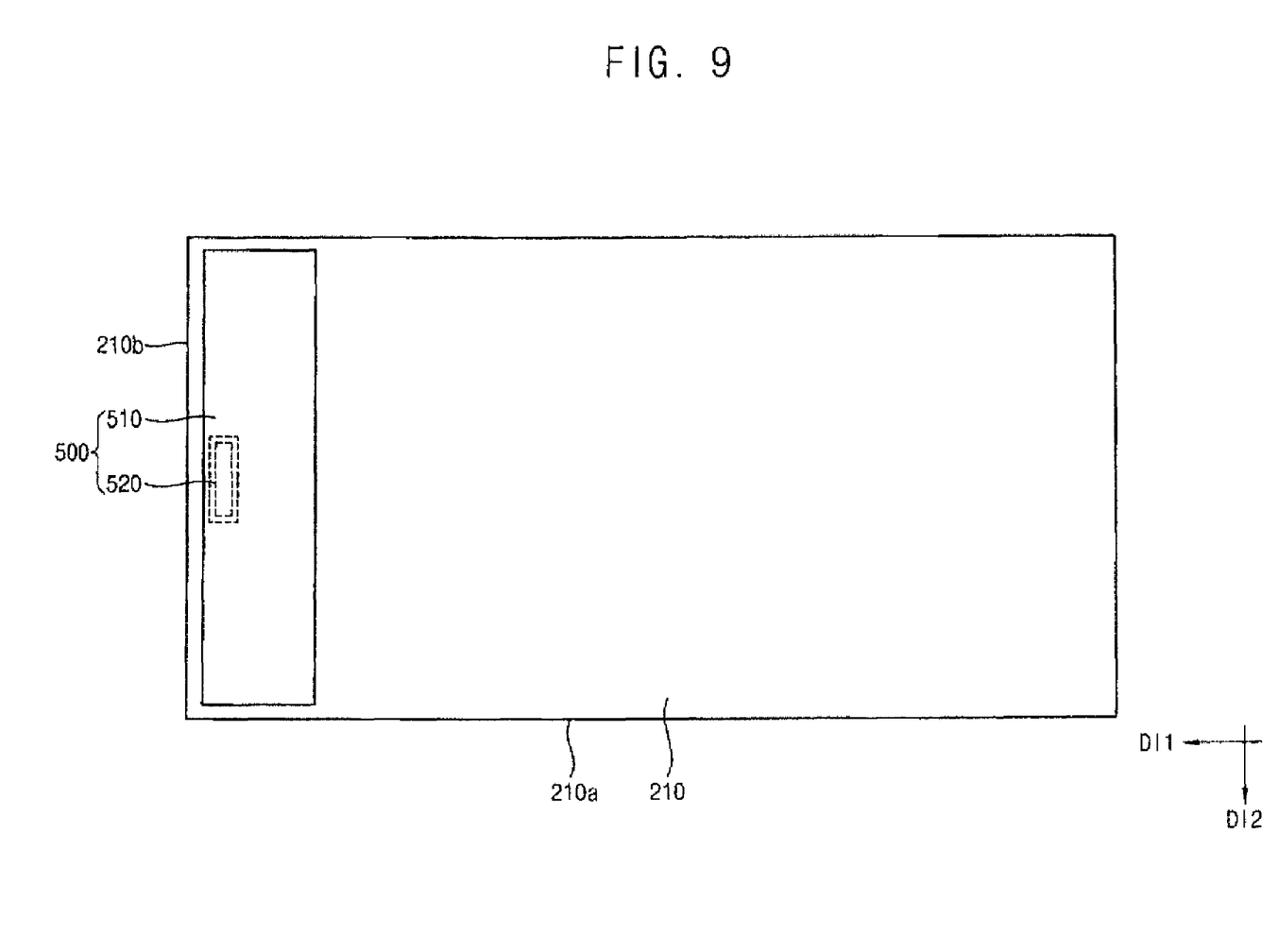
FIG. 9 is a plan view illustrating the position of a light source driving board in FIG. 8.

FIG. 8 is a plan view illustrating a positional relationship between a light-generating board and a coupling board of a backlight assembly according to an example embodiment of the present invention. FIG. 9 is a plan view illustrating the position of a light source driving board in FIG. 8.

Referring to FIGS. 8 and 9, the coupling board 400 may be adjacent to and substantially parallel with one of the short sidewalls 224 of the receiving container 200. Particularly, the coupling board body 410 of the coupling board 400 may be adjacent to and substantially parallel with the one of the short sidewalls 224, and the coupling slot connector 420 of the coupling board 400 may be disposed on a face of the coupling board body 410 not facing the one of the short sidewalls 224.

For example, four coupling slot connectors 420 may be arranged on a face of the coupling board body 410 at regular intervals. Thus, four light-generating boards 300 are disposed in a row along the second direction DI1 corresponding to the four coupling slot connectors 420. Thus, the insertion protrusions 330 of the four light-generating boards 300 may be inserted and coupled to the four coupling slot connectors 420.

Each of the light-generating board bodies 310 of the four light-generating boards 300 may have a substantially rectangular shape, in which a length in the first direction DI1 is longer than a length in the second direction DI2. The light sources 320 may be disposed, for example, on a face of each light-generating board body 310 in three rows and nineteen columns.

The light source driving board 500 may be disposed under the bottom plate 210 corresponding to the coupling board 400, and adjacent to one of the short sides 210b of the bottom plate 210. In addition, the driving board body 510 of the light source driving board 500 may have a substantially rectangular shape, in which a length in the second direction DI2 is longer than a length in the first direction DI1.

The driving slot connector 520 of the light source driving board 500 is disposed on a face of the driving board body 510 facing the coupling board 400. For example, the driving slot connector 520 corresponds to the center of the driving board body 510 in the second direction DI2, and is adjacent to one of the short sides 210b.

The connection protrusion 430 of the coupling board 400 protrudes from the coupling board body 410 toward the light source driving board 500, and may be inserted into the driving slot connector 520 via a connecting hole of the bottom plate 210. For example, the connection protrusion 430 may be disposed corresponding to the center of the coupling board body 410 in the second direction DI2. Thus, the coupling board 400 may have a substantially T-shaped cross-section.

Figure 10:
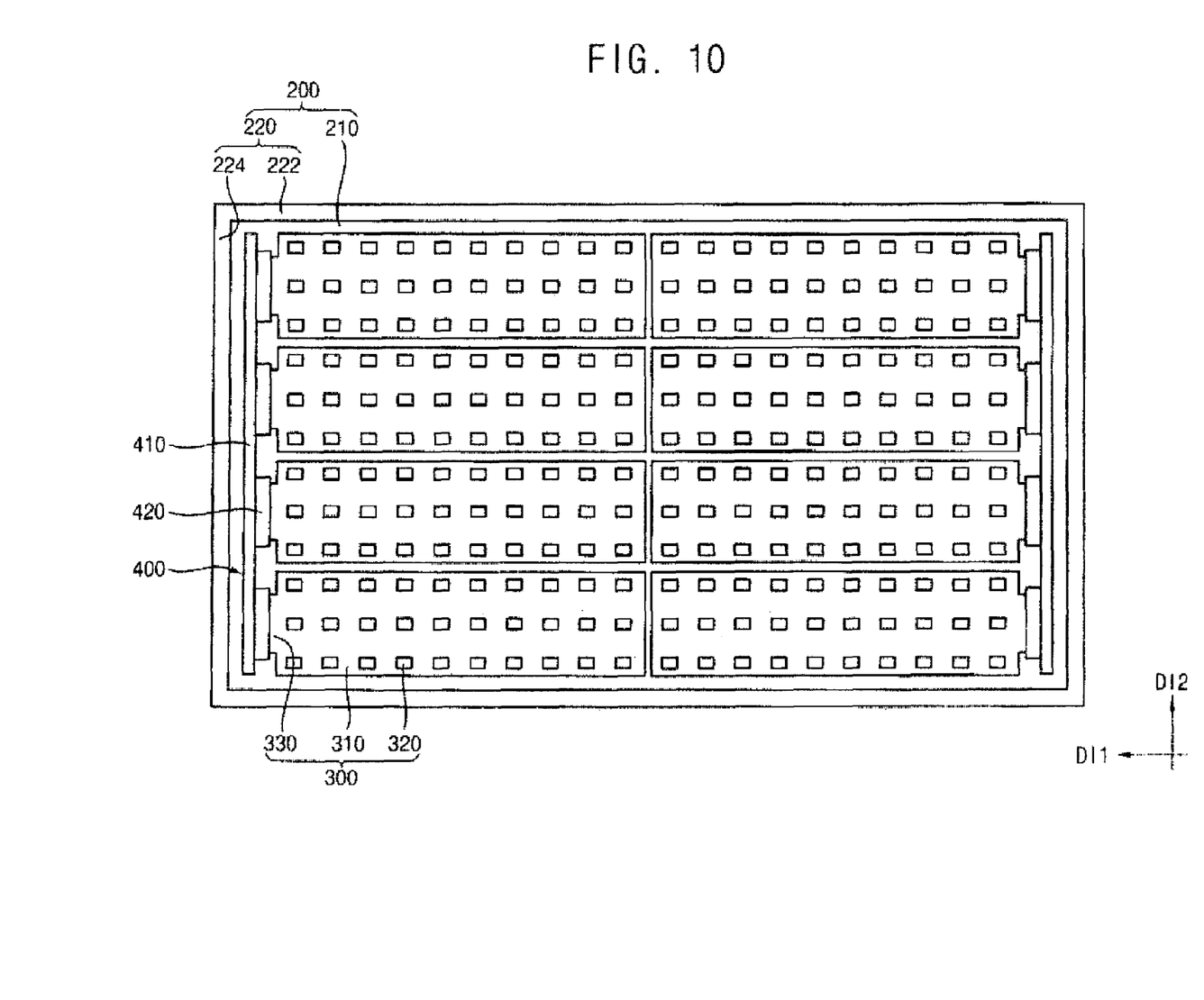
FIG. 10 is a plan view illustrating a positional relationship between a light-generating board and a coupling board of a backlight assembly according to an example embodiment of the present invention.
Figure 11:
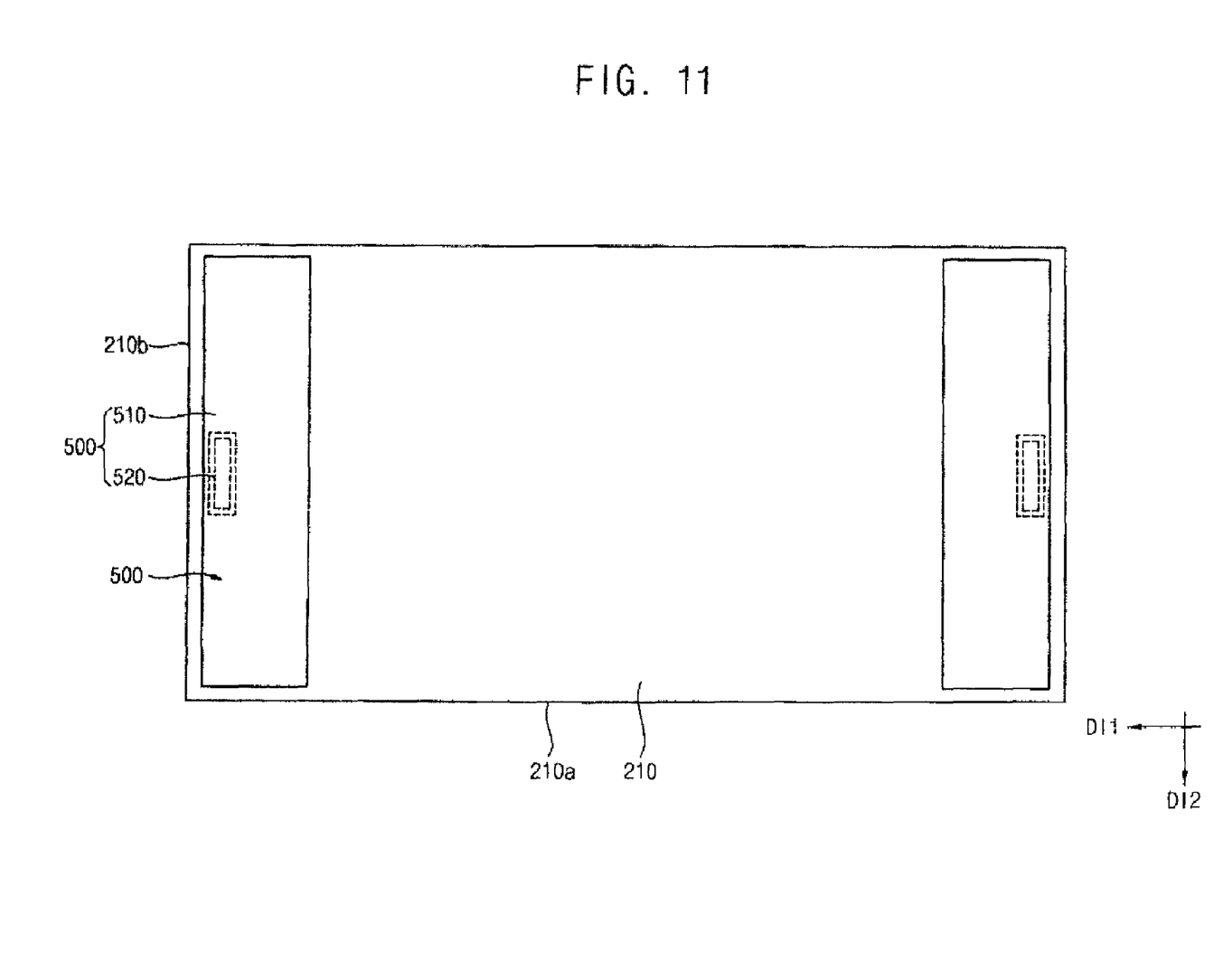
FIG. 11 is a plan view illustrating the position of a light source driving board in FIG. 10.

FIG. 10 is a plan view illustrating a positional relationship between a light-generating board and a coupling board of a backlight assembly according to an example embodiment of the present invention. FIG. 11 is a plan view illustrating the position of a light source driving board in FIG. 10.

Referring to FIGS. 10 and 11, two coupling boards 400 are adjacent to and substantially parallel with the short sidewalls 224 of the receiving container 200. Particularly, the coupling board bodies 410 of the two coupling boards 400 may be adjacent to and substantially parallel with the short sidewalls 224, and the coupling slot connectors 420 of the two coupling boards 400 may be disposed on faces of the coupling board bodies 410 not facing the short sidewalls 224.

For example, four coupling slot connectors 420 may be respectively disposed on the faces of the coupling board bodies 410 and spaced at regular intervals. That is, eight coupling slot connectors 420 may be disposed on the faces of the coupling board bodies 410. Thus, eight light-generating boards 300 are disposed in four rows and two columns corresponding to the eight coupling slot connectors 420. Thus, the insertion protrusions 330 of the eight light-generating boards 300 may be inserted into and coupled to the eight coupling slot connectors 420.

Each of the light-generating board bodies 310 of the eight light-generating boards 300 may have a substantially rectangular shape, in which a length in the first direction DI1 is longer than a length in the second direction DI2. The light sources 320 may be disposed, for example, on a face of each light-generating board body 310 in three rows and nine columns.

In an example embodiment, two light source driving boards 500 may be disposed under the bottom plate 210, and adjacent to the short sides 210b of the bottom plate 210 corresponding to the coupling boards 400. In addition, the driving board bodies 510 of the light source driving boards 500 may have a substantially rectangular shape, in which a length in the second direction DI2 is longer than a length in the first direction DI1.

The driving slot connectors 520 of the light source driving boards 500 are disposed on faces of the driving board bodies 510 facing the coupling boards 400. For example, the driving slot connectors 520 may be disposed adjacent to the short sides 210b corresponding to the centers of the driving board bodies 510 in the second direction DI2.

The connection protrusions 430 of the coupling boards 400 protrude from the coupling board bodies 410 toward the light source driving board 500, and may be inserted into the driving slot connectors 520 via connecting holes of the bottom plate 210. For example, the connection protrusions 430 may be disposed corresponding to the centers of the coupling board bodies 410 in the second direction DI2. Thus, each of the coupling boards 400 may have a substantially T-shaped cross-section.

Figure 12:
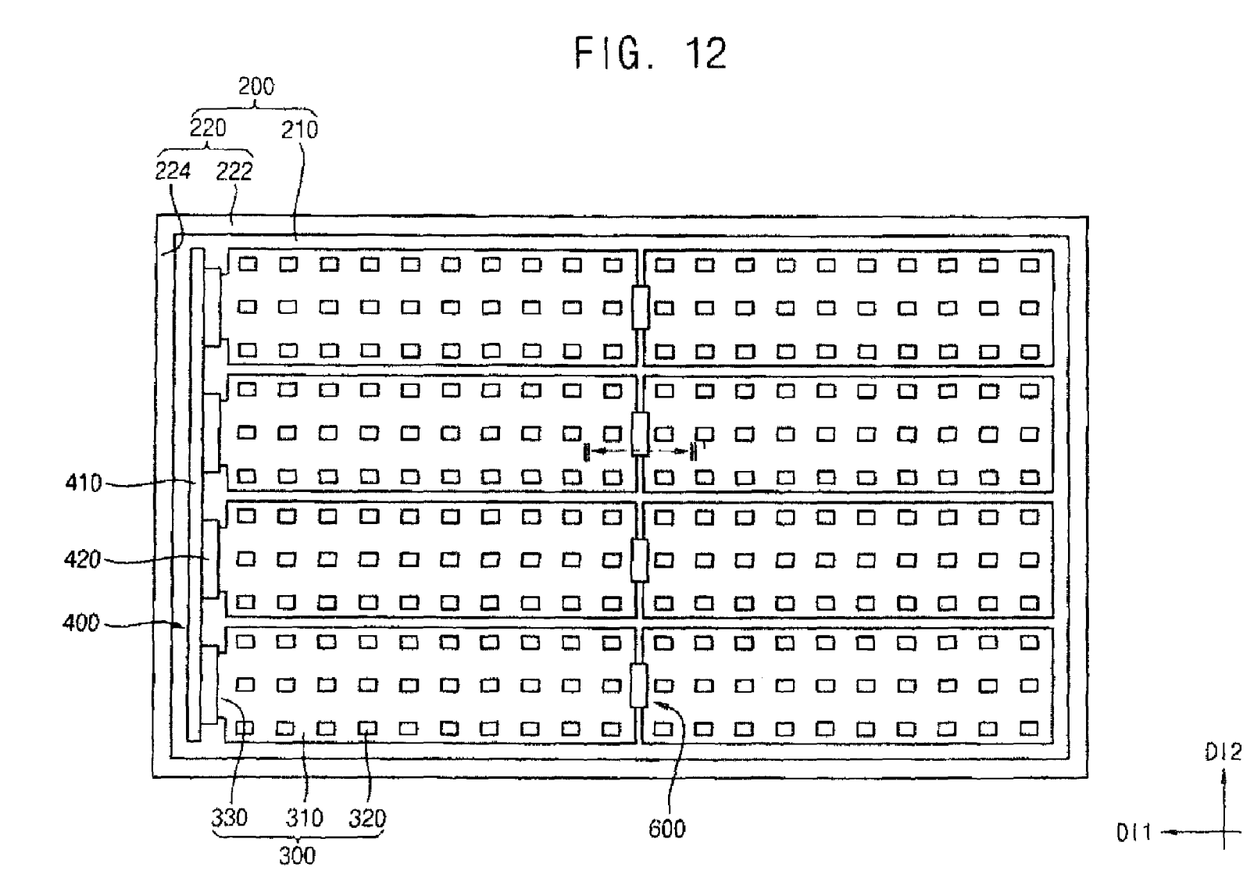
FIG. 12 is a plan view illustrating a positional relationship between a light-generating board and a coupling board of a backlight assembly according to an example embodiment of the present invention.
Figure 13:
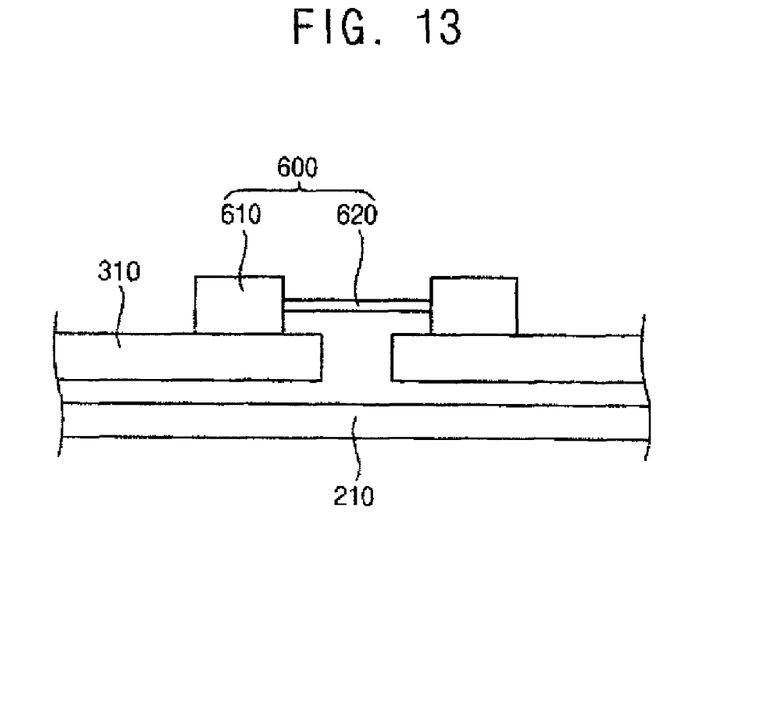
FIG. 13 is a cross-sectional view taken along a line II-II' in FIG. 12.
Figure 14:
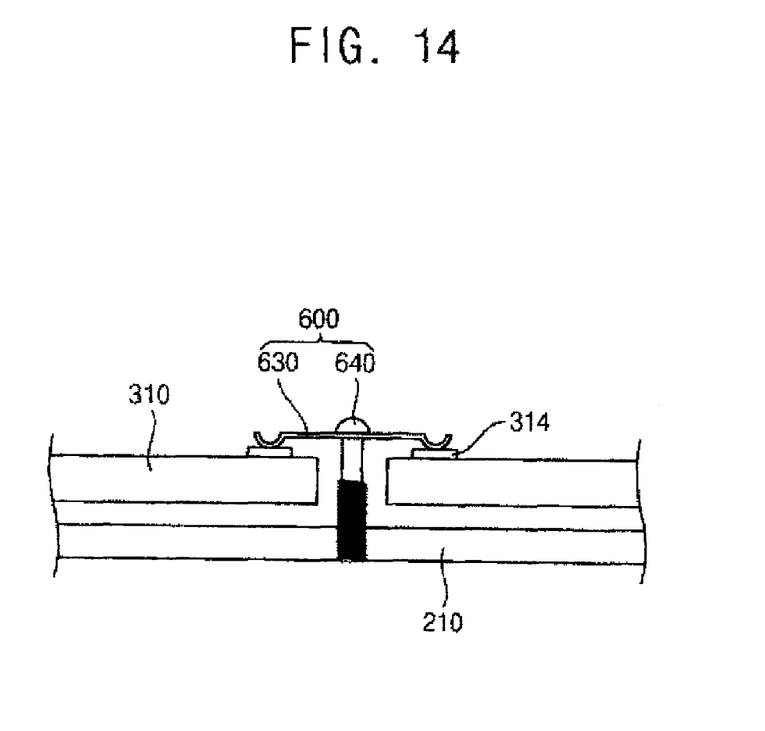
FIG. 14 is a cross-sectional view illustrating a board connecting part according to an example embodiment of the present invention.

FIG. 12 is a plan view illustrating a positional relationship between a light-generating board and a coupling board of a backlight assembly according to an example embodiment of the present invention. FIG. 13 is a cross-sectional view taken along a line II-II' in FIG. 12. FIG. 14 is a cross-sectional view illustrating a board connecting part according to an embodiment of the present invention.

Referring to FIGS. 12 and 13, the coupling board 400 may be adjacent to and substantially parallel with one of the short sidewalls 224 of the receiving container 200. Particularly, the coupling board body 410 of the coupling board 400 may be adjacent to and substantially parallel with the one of the short sidewalls 224, and the coupling slot connector 420 of the coupling board 400 may be disposed on a face of the coupling board body 410 not facing the one of the short sidewalls 224. For example, four coupling slot connectors 420 may be disposed on the face of the coupling board body 410 and spaced at regular intervals.

In FIGS. 12 and 13, eight light-generating boards 300 may be disposed in the receiving container 200. For example, the eight light-generating boards 300 may be disposed in four rows and two columns. Each of the light-generating boards 300 disposed at a first column among the eight light-generating boards 300 includes the insertion protrusion 330 protruding from the light-generating board body 310 toward the coupling board 400 and in contrast, each of the light-generating boards 300 disposed at a second column among the eight light-generating boards 300 does not includes the insertion protrusion 330. Thus, the insertion protrusions 330 of the light-generating boards 300 disposed at the first column may be inserted into and coupled to four coupling slot connectors 420.

Each of the light-generating board bodies 310 of the eight light-generating boards 300 may have a substantially rectangular shape, in which a length in the first direction DI1 is longer than a length in the second direction DI21.

The backlight assembly according to an example embodiment may further include a board connecting part 600 electrically connecting adjacent light-generating boards 300 to each other.

For example, four board connecting parts 600 may electrically connect the light-generating boards 300 disposed at the first column and the light-generating boards 300 disposed at the second column and within the same row to each other.

Referring to FIG. 13, the board connecting part 600 may include wire connectors 610 disposed on faces of adjacent light-generating board bodies 310 and a connection wire 620 electrically connecting the wire connectors 610.

Alternatively, referring to FIG. 14, the board connecting part 600 may include a conductive connecting member 630 electrically connecting metal patterns 314 formed on the faces of adjacent light-generating board bodies 310.

In addition, the board connecting part 600 may further include a fixing member 640 fixing the conductive connecting member 630. The fixing member 640 may include, for example, a screw fixing the conductive connecting member 630 to the bottom plate 210 of the receiving container 200.

According to the embodiments of the present invention, a light-generating board is directly coupled via a slot and protrusion combination to a coupling board, and the coupling board is directly coupled via a slot and protrusion combination to a light source driving board via a connecting hole of a bottom plate. Thus, manufacturing efficiency and connection stability in electrically connecting the light-generating board and the light source driving board may be improved.

The foregoing is illustrative of embodiments of the present invention and is not to be construed as limiting thereof. Although a few example embodiments of the present invention have been described, those skilled in the art will readily appreciate that many modifications are possible in the example embodiments without materially departing from the disclosure of the present invention. Accordingly, all such modifications are intended to be included within the scope of the present invention as defined in the claims. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims.

What is claimed is:

1. A backlight assembly comprising:
   at least one light-generating board;
   a light source driving board controlling the light-generating board; and
   a coupling board coupled via slot connectors to the light-generating board and the light source driving board to electrically connect the light-generating board and the light source driving board to each other, wherein the coupling board comprises:
   a coupling board body disposed at a side of and substantially perpendicular to the light-generating board; and
   at least one coupling slot connector disposed on a face of the coupling board body facing the light-generating board, a portion of the light-generating board being inserted into the coupling slot connector to electrically connect the coupling board to the light generating board.

2. The backlight assembly of claim 1, further comprising a receiving container including a bottom plate and a sidewall extending from the bottom plate, and receiving the light-generating board and the coupling board.

3. The backlight assembly of claim 2, wherein the coupling board is substantially perpendicular to the bottom plate.

4. The backlight assembly of claim 3, wherein the light-generating board comprises:
   a light-generating board body disposed substantially parallel with the bottom plate;
   a plurality of light sources disposed on a face of the light-generating board body not facing the bottom plate; and
   a protrusion protruding from the light-generating board body toward the coupling board to be inserted into the coupling slot connector.

5. The backlight assembly of claim 3, wherein the light source driving board comprises:
   a driving board body disposed under the bottom plate and substantially parallel with the bottom plate; and
   a driving slot connector into which a portion of the coupling board is inserted via a connecting hole formed through the bottom plate to electrically connect the light source driving board with the coupling board.

6. The backlight assembly of claim 5, wherein the coupling board comprises a protrusion protruding from the coupling board body toward the light source driving board to be inserted into the driving slot connector via the connecting hole.

7. The backlight assembly of claim 2, wherein the bottom plate has a substantially rectangular shape including long and short sides, in which a length in a first direction is longer than a length in a second direction substantially perpendicular to the first direction, and the sidewall includes long sidewalls disposed at the long sides of the bottom plate and short sidewalls disposed at the short sides of the bottom plate.

8. The backlight assembly of claim 7, wherein the coupling board is adjacent to and substantially parallel with one of the long sidewalls.

9. The backlight assembly of claim 8, wherein the light-generating board has a substantially rectangular shape, in which a length in the second direction is longer than a length in the first direction, and a plurality of the light-generating boards is disposed along the first direction.

10. The backlight assembly of claim 8, wherein the light source driving board is disposed under the bottom plate and adjacent to one of the long sides of the bottom plate.

11. The backlight assembly of claim 10, wherein the light source driving board has a substantially rectangular shape, in which a length in the first direction is longer than a length in the second direction.

12. The backlight assembly of claim 10, wherein the coupling board has a substantially T-shaped cross-section.

13. The backlight assembly of claim 8, wherein the light source driving board is disposed under the bottom plate and adjacent to one of the short sides of the bottom plate.

14. The backlight assembly of claim 13, wherein the light source driving board has a substantially rectangular shape, in which a length in the second direction is longer than a length in the first direction.

15. The backlight assembly of claim 13, wherein the coupling board has a substantially L-shaped cross-section.

16. The backlight assembly of claim 7, wherein the coupling board is adjacent to and substantially parallel with one of the short sidewalls.

17. The backlight assembly of claim 16, wherein the light-generating board has a substantially rectangular shape, in which a length in the first direction is longer than a length in the second direction, and a plurality of the light-generating boards is disposed along the second direction.

18. The backlight assembly of claim 17, further comprising a board connecting part electrically connecting the light-generating boards adjacent to each other in the first direction.

19. The backlight assembly of claim 7, wherein a pair of coupling boards is adjacent to and substantially parallel with respective short sidewalls, and a pair of light source driving boards is disposed under the bottom plate and adjacent to respective short sides of the bottom plate.

20. A display device comprising:
   a display panel; and
   a backlight assembly comprising:
   at least one light-generating board configured to generate light and provide the light to the display panel;
   a light source driving board providing control signals to the light-generating board; and
   a coupling board coupled via slots to the light-generating board and the light source driving board to electrically connect the light-generating board and the light source driving board to each other, wherein the coupling in board comprises:
   a coupling board body disposed at a side of and substantially perpendicular to the light-generating board; and
   at least one slot disposed on a face of the coupling board body facing the light-generating board, a portion of the light-generating board being inserted into the slot to electrically connect the coupling board to the light generating board.

21. A backlight assembly comprising:
   a light-generating board including a first protrusion;
   a coupling board including a first slot and a second protrusion oriented substantially perpendicular to the first protrusion; and
   a light source driving board including a second slot oriented substantially perpendicular to the first slot, wherein the first protrusion is inserted into the first slot and the second protrusion is inserted into the second slot to electrically connect the light-generating board with the light source driving board.

* * * * *